United States Patent
Hu et al.

(10) Patent No.: US 12,468,098 B2
(45) Date of Patent: Nov. 11, 2025

(54) OPTICAL INTERPOSER FOR CHIP CONNECTION

(71) Applicant: FOCI FIBER OPTIC COMMUNICATIONS, INC., Hsinchu (TW)

(72) Inventors: Ting-Ta Hu, Hsinchu (TW); Po-Yi Wu, Hsinchu (TW); Chieh-Yu Fang, Hsinchu (TW); Ting-Yan Lin, Hsinchu (TW)

(73) Assignee: FOCI FIBER OPTIC COMMUNICATIONS, INC., Hsinchu (TW)

( * ) Notice: Subject to any disclaimer, the term of this patent is extended or adjusted under 35 U.S.C. 154(b) by 286 days.

(21) Appl. No.: 18/202,370

(22) Filed: May 26, 2023

(65) Prior Publication Data
US 2024/0353632 A1    Oct. 24, 2024

(30) Foreign Application Priority Data

Apr. 19, 2023    (TW) .................................. 112203657

(51) Int. Cl.
*G02B 6/42* (2006.01)
*G02B 6/43* (2006.01)

(52) U.S. Cl.
CPC ............. *G02B 6/4214* (2013.01); *G02B 6/43* (2013.01)

(58) Field of Classification Search
CPC ..................................................... G02B 6/4214
See application file for complete search history.

(56) References Cited

U.S. PATENT DOCUMENTS

2023/0091050 A1*    3/2023  Zhang ...................... G02B 6/43
                                                                         385/31

* cited by examiner

*Primary Examiner* — Sung H Pak

(57) ABSTRACT

The present invention provides an optical interposer for chip connection including a first total internal reflective layer, a waveguide and a second total internal reflective layer. The optical interposer is disposed above a first photonic integrated circuit chip and a second photonic integrated circuit chip, coupling with the first photonic integrated circuit chip and the second photonic integrated circuit chip. The refractive indices of the first total internal reflective layer and the second total internal reflective layer are lower than the waveguide, making a light signal perform repetitive total internal reflections at the junctions between materials and advance in a zigzag shape within the waveguide, and further transmit between the first photonic integrated circuit chip and the second photonic integrated circuit chip.

3 Claims, 2 Drawing Sheets

OPTICAL INTERPOSER FOR CHIP CONNECTION

CROSS-REFERENCE TO RELATED APPLICATION

The present invention relates generally to an optical interposer, and more particularly, to an optical interposer for chip connection.

BACKGROUND OF THE INVENTION

1. Field of the Invention

The present invention relates generally to an optical interposer, and more particularly, to provide an optical interposer for chip connection.

2. The Prior Arts

A well-known chip connection method is metal (such as copper) wiring, which is plating a metal between the chips to be connected. Recently, due to the fast transmission speed and energy-saving features of fibers, the technologies of using fibers to replace metal wiring to connect chips are valued. However, since well-known fiber manufacturing processes include steps such as polishing and cutting, when fibers are applied in chip connection, the fiber structure may be damaged because the scale is too small (approximately at the scale of millimeters).

To realize fiber transmission within the scale of chip connection, the semiconductor manufacturing processes of photonic integrated circuit (PIC), such as etching and growing, may be used to form a light-transmission interface with a structure similar to a fiber between chips. The present invention provides an optical interposer of which the structure is similar to a fiber, and is capable of connecting a plurality of photonic integrated circuit chips in order to realize fast and energy-saving signal transmission.

SUMMARY OF THE INVENTION

A primary objective of the present invention is to provide an optical interposer for chip connection whose structure is similar to a fiber, and is capable of connecting a plurality of photonic integrated circuit chips.

For achieving the foregoing objectives, the present invention provides an optical interposer for chip connection, including a first total internal reflective layer, a waveguide and a second total internal reflective layer, wherein the optical interposer is placed above a first photonic integrated circuit chip and a second photonic integrated circuit chip, and couples the first photonic integrated circuit chip and the second photonic integrated circuit chip. The refractive indices of the first total internal reflective layer and the second total internal reflective layer are smaller than the refractive index of the waveguide, allowing a light signal to perform repetitive total internal reflections at the junctions between materials and advance in a zigzag shape within the waveguide, and further transmit between the first photonic integrated circuit chip and the second photonic integrated circuit chip.

According to an embodiment of the present invention, the optical interposer for chip connection further includes a first tilted reflective surface and a second tilted reflective surface located at both sides of the optical interposer, allowing the light signal to be emitted upwards from the first photonic integrated circuit chip, totally reflected through the first tilted reflective surface and transmitting forward, and then totally reflected downwards through the second tilted reflective surface and entering the second photonic integrated circuit chip.

According to an embodiment of the present invention, between the first photonic integrated circuit chip and the second photonic integrated circuit chip are a plurality of the optical interposer coupling a plurality of nodes of the first photonic integrated circuit chip and a plurality of nodes of the second photonic integrated circuit chip, the layout of the optical interposers being interleaving without causing the mutual interference between the light signals.

Accordingly, the present invention is advantageously adapted for: connecting photonic integrated circuit chips with a fiber structure to realize fast and energy-saving signal transmission.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

The accompanying drawings are included to provide a further understanding of the invention and are incorporated in and constitute a part of this specification. The drawings illustrate embodiments of the invention and, together with the description, serve to explain the principles of the invention.

Figure 1:
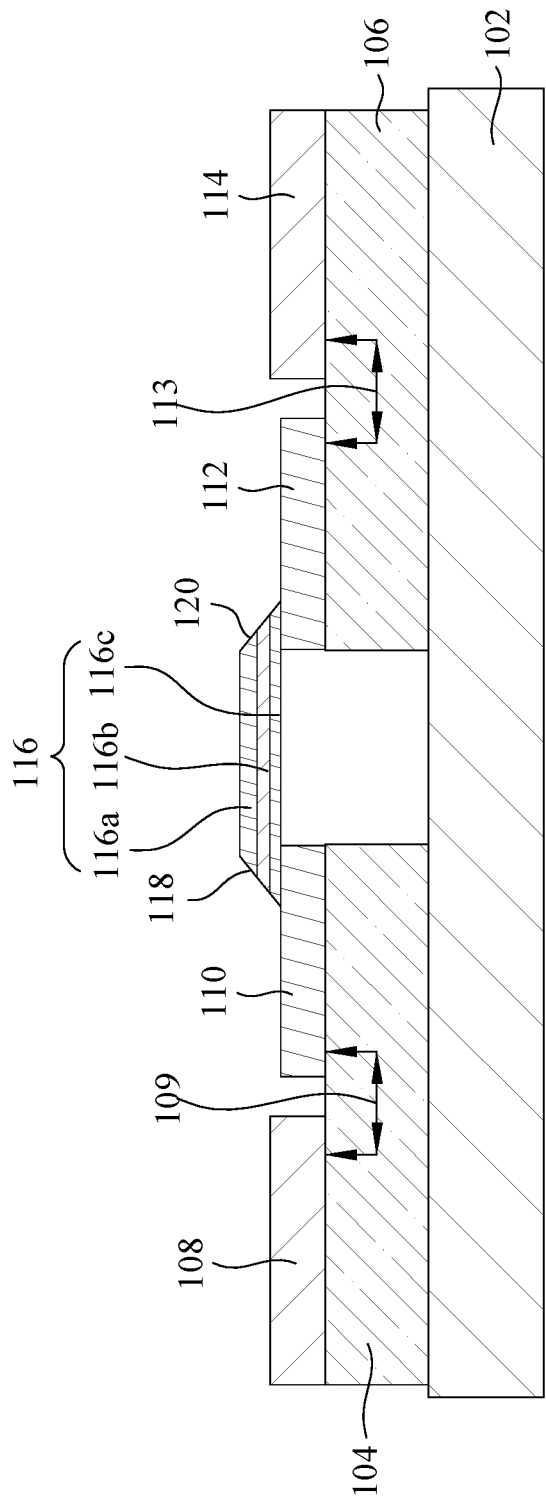
FIG. 1 is a schematic diagram of the semiconductor structure applied to the present invention.

Referring to FIG. 1, in an embodiment, the present invention applies to the semiconductor structure shown in FIG. 1. Above a printed circuit board 102 are a first interposer 104 and a second interposer 106, above the first interposer 104 are a first electronic integrated circuit (EIC) chip 108 and a first photonic integrated circuit (PIC) chip 110, and the first electronic integrated circuit chip 108 and the first photonic integrated circuit chip 110 are connected with a wire 109. Above the second interposer 106 are a second photonic integrated circuit chip 112 and a second electronic integrated circuit chip 114, and the second photonic integrated circuit chip 112 and the second electronic integrated circuit chip 114 are connected with a wire 113.

To connect the first photonic integrated circuit chip 110 and the second photonic integrated circuit chip 112, the present invention uses an optical interposer 116 placed between the first photonic integrated circuit chip 110 and the second photonic integrated circuit chip 112 to couple the first photonic integrated circuit chip 110 and the second photonic integrated circuit chip 112. The structure of the optical interposer is similar to the structure of a well-known fiber, having a first total internal reflective layer 116a, a waveguide 116b and a second total internal reflective layer 116c. The refractive indices of the first total internal reflective layer 116a and the second total internal reflective layer 116c (such as low refractive index glass or plastic) are smaller than the refractive index of the waveguide 116b (such as high refractive index glass), allowing a light signal to perform repetitive total internal reflections at the junctions between materials and advance in a zigzag shape within the waveguide 116b, and further allowing the light signal to transmit between the first photonic integrated circuit chip 110 and the second photonic integrated circuit chip 112. By well-known semiconductor manufacturing processes, the first total internal reflective layer 116a, the waveguide 116b and the second total internal reflective layer 116c may be grown at desired positions and form a light-transmission interface between the first photonic integrated circuit chip 110 and the second photonic integrated circuit chip 112.

As shown in FIG. 1, since the optical interposer 116 is placed above the first photonic integrated circuit chip 110 and the second photonic integrated circuit chip 112, both sides of the optical interposer 116 may have tilted reflective structures to allow the light signal to be emitted upwards from the first photonic integrated circuit chip 110, totally reflected through a first tilted reflective surface 118 and transmitting forward, and then totally reflected downwards through a second tilted reflective surface 120 and entering the second photonic integrated circuit chip 112. In the present embodiment, the tilting angles of the first tilted reflective surface 118 and the second tilted reflective surface 120 are 45 degrees.

Figure 2:
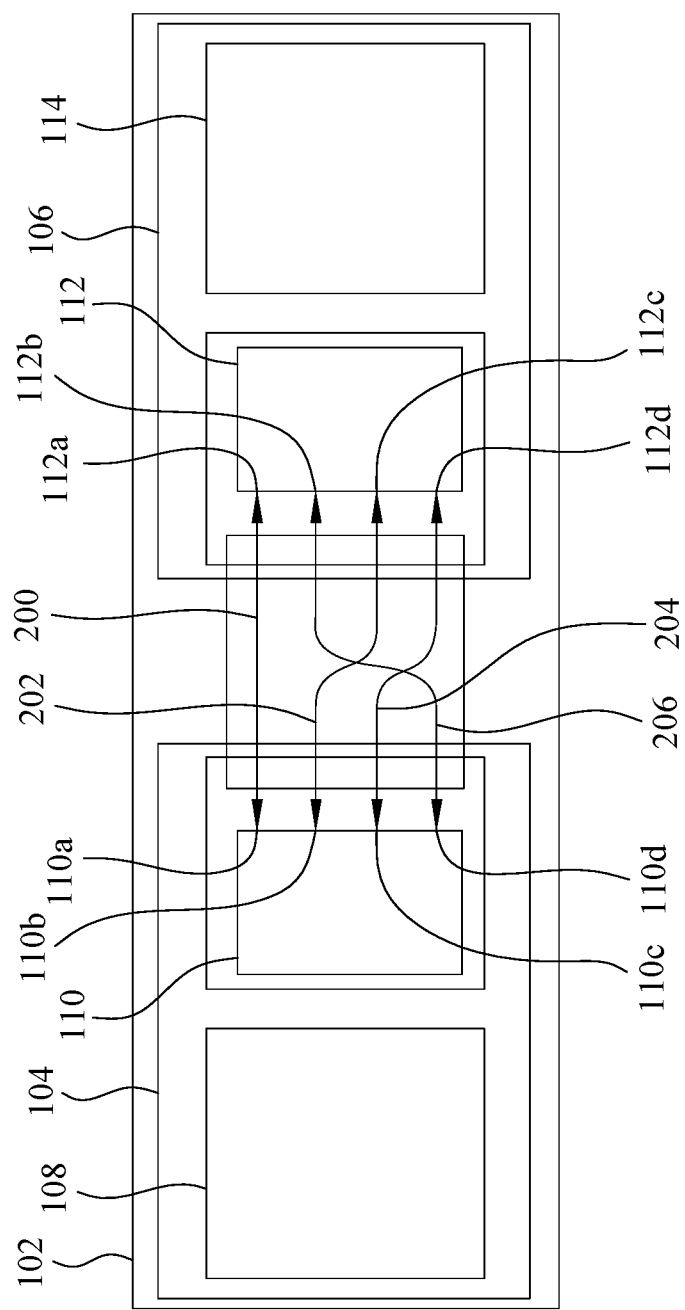
FIG. 2 is a top view of the semiconductor structure shown in FIG. 1.

Referring to FIG. 2, in the embodiment shown in FIG. 1, between the first photonic integrated circuit chip 110 and the second photonic integrated circuit chip 112 may be a plurality of optical interposers 200, 202, 204 and 206. In FIG. 2, four optical interposers are illustrated, but the present invention is not limited thereto. Unlike well-known metal wiring, due to the light signals within different optical interposers being totally internal reflected and advancing within the waveguides without leaving the waveguides, the layout of the optical interposers 200, 202, 204 and 206 may be interleaving without causing the mutual interference between the light signals. In the embodiment shown in FIG. 2, the first photonic integrated circuit chip 110 has nodes 110a, 110b, 110c and 110d, and the second photonic integrated circuit chip 112 has nodes 112a, 112b, 112c and 112d. The node 110a is coupled to the node 112a through the optical interposer 200, the node 110b is coupled to the node 112c through the optical interposer 202, the node 110c is coupled to the node 112d through the optical interposer 204, and the node 110d is coupled to the node 112b through the optical interposer 206.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. An optical interposer for chip connection, comprising:
a first total internal reflective layer;
a waveguide, and
a second total internal reflective layer,
wherein:
the optical interposer is grown at a desired position directly above a first photonic integrated circuit chip and a second photonic integrated circuit chip in a semiconductor manufacturing process of the first and second photonic integrated circuit chips to form a light-transmission interface for coupling with the first photonic integrated circuit chip and the second photonic integrated circuit chip; and
refractive indices of the first total internal reflective layer and the second total internal reflective layer are smaller than a refractive index of the waveguide, allowing a light signal to perform repetitive total internal reflections at junctions between materials and advance in a zigzag shape within the waveguide, and further transmit between the first photonic integrated circuit chip and the second photonic integrated circuit chip.

2. The optical interposer for chip connection according to claim 1, further includes a first tilted reflective surface and a second tilted reflective surface located at both sides of the optical interposer, allowing the light signal to be emitted upwards from the first photonic integrated circuit chip, totally reflected through the first tilted reflective surface and transmitting forward, and then totally reflected downwards through the second tilted reflective surface and entering the second photonic integrated circuit chip.

3. The optical interposer for chip connection according to claim 1, wherein between the first photonic integrated circuit chip and the second photonic integrated circuit chip are a plurality of the optical interposers coupling a plurality of nodes of the first photonic integrated circuit chip and a plurality of nodes of the second photonic integrated circuit chip, a layout of the optical interposers being interleaving without causing mutual interference between light signals.

* * * * *